United States Patent [19]

Okuno et al.

[11] Patent Number: 5,178,443

[45] Date of Patent: Jan. 12, 1993

[54] HYDRAULIC BRAKING SYSTEM FOR AN AUTOMOTIVE VEHICLE HAVING A PUMP AND A DAMPER

[75] Inventors: Junichi Okuno, Kariya; Michiharu Nishii, Toyota; Genji Mizuno, Toyoake, all of Japan

[73] Assignee: Aisin Seiki K.K., Kariya, Japan

[21] Appl. No.: 676,487

[22] Filed: Mar. 28, 1991

[30] Foreign Application Priority Data

Mar. 30, 1990 [JP] Japan ................................. 2-86919

[51] Int. Cl.$^5$ ..................... B60T 13/14; B60T 17/02
[52] U.S. Cl. ........................ 303/116.2; 303/DIG. 4
[58] Field of Search ............. 303/113 R, 87, 113 TR, 303/113 TB, 114 R, 115 R, 115 PP, 11, 116 R, 116 SD, DIG. 3, DIG. 4, 110, 92

[56] References Cited

U.S. PATENT DOCUMENTS

| | | | |
|---|---|---|---|
| 4,565,411 | 1/1986 | Seiber | 303/110 |
| 4,848,853 | 7/1989 | Mizuno et al. | 303/110 |
| 4,865,398 | 9/1989 | Takeuchi et al. | 303/115 R |
| 4,874,207 | 10/1989 | Nishii et al. | 303/6.01 X |
| 4,895,416 | 1/1990 | Tozu et al. | 303/92 |

FOREIGN PATENT DOCUMENTS 1-106760  4/1989  Japan .
2158905  11/1985  United Kingdom ......... 303/DIG. 4

Primary Examiner—Robert J. Oberleitner
Assistant Examiner—Alfred Muratori
Attorney, Agent, or Firm—Sughrue Mion, Zinn Macpeak & Seas

[57] ABSTRACT

A hydraulic braking system for an automotive vehicle having a power pressure source for generating a hydraulic power pressure, a master cylinder generating a hydraulic braking pressure in response to depression of a brake pedal, a dynamic hydraulic pressure generator for regulating the hydraulic power pressure in response to depression of the brake pedal and generating a regulated braking pressure, and a plurality of wheel brake cylinders for braking respective road wheels with one of the hydraulic braking pressure supplied from the master cylinder and the regulated braking pressure supplied from the dynamic hydraulic pressure generator. A power pressure changeover valve is provided and repeatedly changed over to be placed in one of a first operating position where a passage defining therein a closed space is communicated with a space under atmospheric pressure, and a second operating position where the passage is communicated with the power pressure source when the hydraulic power pressure exceeds a predetermined value, so that the hydraulic power pressure is reduced to a proper value.

6 Claims, 2 Drawing Sheets

HYDRAULIC BRAKING SYSTEM FOR AN AUTOMOTIVE VEHICLE HAVING A PUMP AND A DAMPER

BACKGROUND OF THE INVENTION

1. Field of the Invention

The present invention relates to a hydraulic braking system for use in an automotive vehicle, and more particularly to a hydraulic braking system which has a hydraulic power pressure source for pressurizing a brake fluid by a fluid pump to generate a hydraulic power pressure.

2. Description of the Prior Art

A conventional service braking system for an automotive vehicle is provided with a hydraulic braking pressure generator for applying a hydraulic braking pressure to wheel brake cylinders mounted on road wheels in response to depression of a brake pedal. The hydraulic braking pressure generator includes a static hydraulic pressure generator such as a master cylinder which introduces a brake fluid from a reservoir and generates a hydraulic braking pressure in response to depression of the brake pedal, and a dynamic hydraulic pressure generator which has a power pressure source for generating a hydraulic power pressure and regulates the hydraulic power pressure supplied therefrom to generate a hydraulic braking pressure regulated in response to depression of the brake pedal.

As to the dynamic hydraulic pressure generator, there is known a hydraulic booster which actuates the master cylinder with the hydraulic power pressure supplied from the power pressure source in response to depression of the brake pedal. U.S. Pat. No. 4,565,411 discloses the hydraulic booster which is provided in the hydraulic braking system as the dynamic hydraulic pressure generator in addition to the master cylinder. In other words, a hydraulic pressure generated by the hydraulic booster in response to depression of the brake pedal is applied directly to the wheel brake cylinders in order to reduce the stroke of the brake pedal. According to the hydraulic braking system as described above, the road wheels are prevented from being locked in braking operation by suitably controlling the hydraulic braking pressure applied to the wheel brake cylinders by means of valve devices, and the acceleration slip of driven wheels is prevented in starting or accelerating operation by communicating the wheel brake cylinders directly with the power pressure source to apply the braking force to the driven wheels.

In U.S. Pat. No. 4,848,853, granted Jul. 18, 1989, there is proposed a system in which in the antilocking operation, the hydraulic pressure is applied from the hydraulic booster to the wheel brake cylinders to which normally the hydraulic braking pressure is applied from the master cylinder, while in the anti-slip operation, the hydraulic power pressure is applied to the wheel brake cylinders through a power pressure changeover valve. Namely, in the anti-locking operation, the hydraulic pressure applied to the wheel brake cylinders is changed over by a first changeover valve to the hydraulic pressure supplied from the dynamic hydraulic pressure generator, while in the anti-slip operation, the wheel brake cylinders are communicated with the power pressure source by a second changeover valve. Thus, the second changeover valve functions as the power pressure changeover valve. With these first and second changeover valves operated in sequence, the smooth changeover operation is ensured without applying the hydraulic power pressure to the master cylinder when the wheel brake cylinders are communicated with the power pressure source.

The above-described hydraulic braking system is so arranged that the hydraulic power pressure supplied from the power pressure source is controlled to a value within a predetermined range by intermittently actuating an electric motor for driving a fluid pump. However, when the fluid pump continues to be driven for some reason, the hydraulic power pressure is increased to exceed a predetermined upper limit value. The continuous output of such a high hydraulic power pressure causes a trouble of the fluid pump or the like. Therefore, the conventional hydraulic braking system is so arranged that the power pressure source is provided with a relief valve which communicates the power pressure source with a reservoir when the hydraulic power pressure supplied from the power pressure source exceeds a certain pressure for opening the relief valve. However, the value of the pressure for opening the relief valve has large dispersion, and it is not easy to maintain it within a certain range.

SUMMARY OF THE INVENTION

Accordingly, it is an object of the present invention to provide a hydraulic braking system having a power pressure source, wherein a hydraulic power pressure supplied from the power pressure source is surely decreased without recourse to a relief valve of the power pressure source when the hydraulic power pressure exceeds a predetermined value.

In accomplishing this and other objects, a hydraulic braking system for an automotive vehicle according to the present invention comprises a master cylinder for generating a hydraulic braking pressure in response to operation of a manually-operated member, a power pressure source having a fluid pump for pressurizing a brake fluid and generating a hydraulic power pressure, a dynamic hydraulic pressure generator for regulating the hydraulic power pressure supplied from the power pressure source in response to operation of the manually-operated member and generating a regulated braking pressure, a plurality of wheel brake cylinders for braking respective road wheels with one of the hydraulic braking pressure supplied from the master cylinder and the regulated braking pressure supplied from the dynamic hydraulic pressure generator. The hydraulic braking system includes a power pressure changeover valve which is connected to a passage defining a closed space therein and selectively placed in one of a first operating position where the passage is communicated with a space under an atmospheric pressure, and a second operating position where the passage is communicated with the power pressure source. The hydraulic braking system further includes a pressure sensor for detecting the hydraulic power pressure generated from the power pressure source, determination means for determining if the hydraulic power pressure detected by the pressure sensor exceeds a predetermined value, and changeover means for repeatedly changing over the power pressure changeover valve to be placed in one of the first operating position and the second operating position of the power pressure changeover valve alternately when the determination means determines that the hydraulic power pressure exceeds the predetermined value.

In the above-described hydraulic braking system, the dynamic hydraulic power pressure generator preferably comprises a hydraulic booster which actuates the master cylinder with the hydraulic power pressure supplied from the power pressure source in response to operation of the manually-operated member.

The above-described hydraulic braking system may include a damper which is disposed in the passage, and which forms therein a space whose volume varies in response to a hydraulic pressure supplied thereinto.

BRIEF DESCRIPTION OF THE DRAWINGS

The above stated object and following description will become readily apparent with reference to the accompanying drawings in which.

DESCRIPTION OF THE PREFERRED EMBODIMENTS

Figure 1:
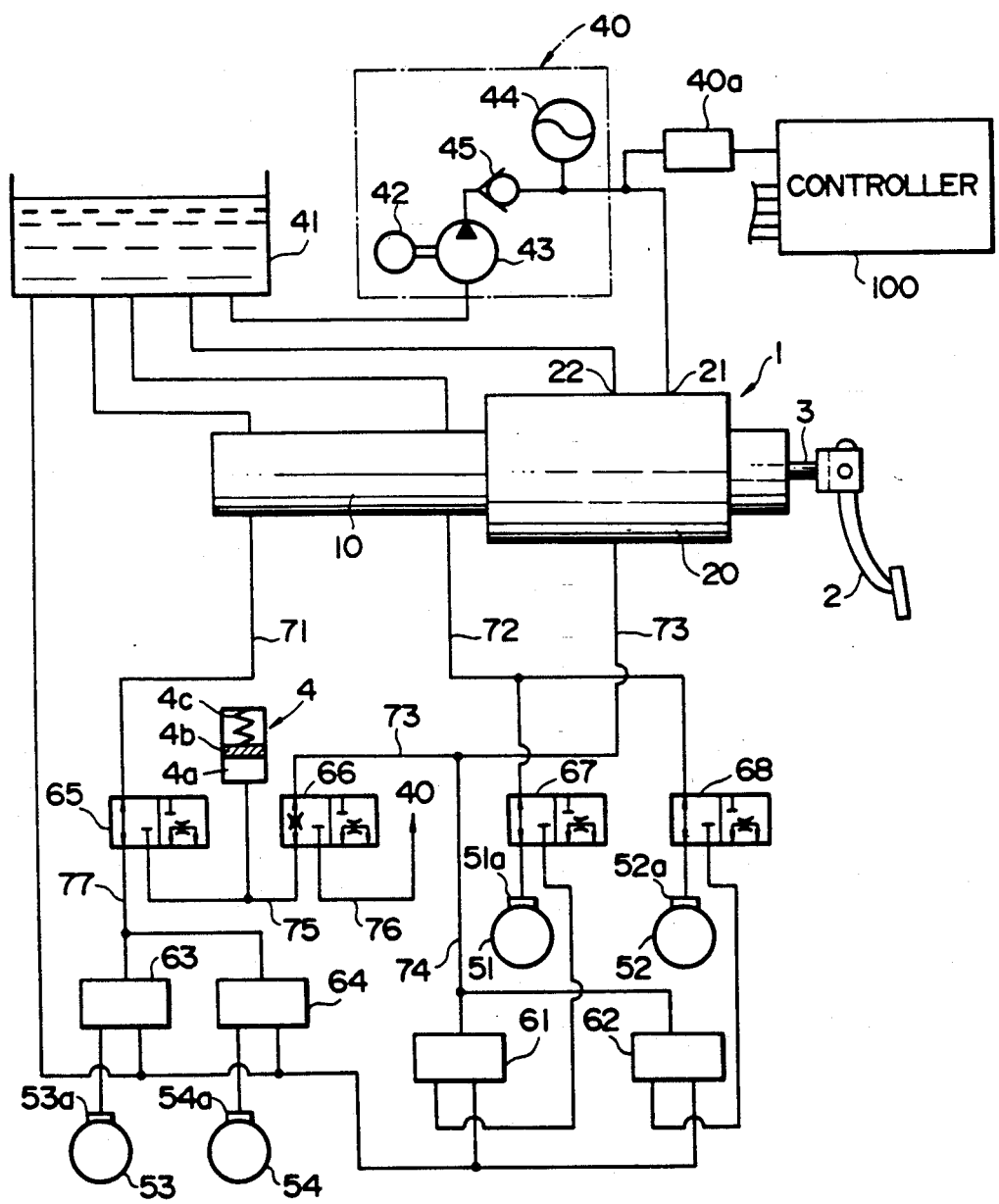
FIG.1 is a schematic illustration of a hydraulic braking system of an embodiment of the present invention.

Referring to FIG.1, there is illustrated a hydraulic braking system of an embodiment of the present invention, which includes a hydraulic braking pressure generator 1 having a tandem master cylinder 10 and a hydraulic booster 20. A depressing force applied on a brake pedal 2, which is provided as a manually-operated member according to the present invention, is transmitted as a braking force through an input rod 3 to the hydraulic braking pressure generator 1. In response to this braking force, a brake fluid supplied from a reservoir 41 or a power pressure source 40 is properly controlled and fed to wheel brake cylinders 51a to 54a mounted on front road wheels 51, 52 and rear road wheels 53, 54 through hydraulic circuits 71, 72. In this embodiment, the front road wheels 51, 52 are non-driven wheels, while the rear road wheels 53, 54 are driven wheels which are driven by an engine (not shown) to be rotated.

The tandem master cylinder 10 is arranged to introduce the brake fluid from the reservoir 41 and generate a hydraulic braking pressure in response to depression of the brake pedal 2, and connected to the hydraulic circuits 71, 72 to supply the hydraulic braking pressure therethrough. The tandem master cylinder 10 is of a well-known structure so that the description thereof will be omitted. The hydraulic booster 20 is arranged to introduce a hydraulic power pressure supplied from the power pressure source 40 through a port 21 as a boost source and regulate the hydraulic power pressure in response to depression of the brake pedal 2 to actuate the tandem master cylinder 10. Thus, the hydraulic booster 20 constitutes a dynamic hydraulic pressure generator according to the present invention. The hydraulic booster 20 is connected to the reservoir 41 through a port 22, and the brake fluid left over after it reaches a predetermined boost pressure, or when the hydraulic booster 20 is stopped, is returned to the reservoir 41.

The power pressure source 40 is provided with a fluid pump 43 driven by an electric motor 42. The input side of the fluid pump 43 is connected to the reservoir 41, while its output side is connected to an accumulator 44 via a check value 45. Accordingly, the pressure of the brake fluid supplied from the reservoir 41 is increased in the fluid pump 43 and supplied as the hydraulic power pressure to necessary portions via the accumulator 44. A pressure sensor 40a is provided in a hydraulic circuit of the power pressure source 40 at the output side thereof to feed an analog signal corresponding to the hydraulic power pressure, or a digital signal converted therefrom, to a controller 100.

One circuit connected to the tandem master cylinder 10 is arranged to communicate with the wheel brake cylinders 53a, 54a of the rear road wheels 53, 54, i.e., driven wheels of a so-called rear-drive vehicle, through the hydraulic circuit 71, a first changeover valve 65, a hydraulic circuit 77 and control valves 63, 64, while the other circuit is arranged to communicate with the wheel brake cylinders 51a, 52a of the front road wheels 51, 52 through the hydraulic circuit 72, a third changeover valve 67 and a fourth changeover valve 68. The hydraulic booster 20 is arranged to communicate with a second changeover valve 66 through a hydraulic circuit 73 and also communicate with control valves 61, 62 through a hydraulic circuit 74. These control valves 61, 62 are connected to the third and fourth changeover valves 67, 68 respectively.

The second changeover valve 66 is connected to the first changeover valve 65 through a hydraulic circuit 75. In this hydraulic circuit 75, a damper 4 is disposed. The damper 4 has a piston 4b slidably disposed in a cylindrical housing to define a fluid chamber 4a whose volume varies in response to the sliding movement of the piston 4b, and a spring 4c disposed in the housing for biasing the piston 4b to reduce the volume of the fluid chamber 4a. The second changeover valve 66 is also connected to the power pressure source 40 through a hydraulic circuit 76.

The first changeover valve 65 is a three ports-two positions solenoid operated valve which is normally positioned in a first operating position where the hydraulic circuit 71 communicates with the hydraulic circuit 77 and the hydraulic circuit 75 is blocked, and which is changed over in its operative condition to a second operating position where the hydraulic circuit 77 communicates with the hydraulic circuit 75 and the hydraulic circuit 71 is blocked. The second changeover valve 66 is also a three ports-two positions solenoid operated valve which is normally positioned in a first operating position where the hydraulic circuit 76 is blocked and the hydraulic circuit 73 communicates with the hydraulic circuit 75 so that the first changeover valve 65 communicates with the hydraulic booster 20. The second changeover valve 66 is changed over in its operative condition to a second operating position where the hydraulic circuit 73 is blocked and the hydraulic circuit 75 communicates with the hydraulic circuit 76 so that the first changeover valve 65 communicates with the power pressure source 40. Namely, the second changeover valve 66 corresponds to a power pressure changeover valve according to the present invention. Further, each of the third and fourth changeover valves 67, 68 is a three ports-two positions solenoid operated valve which is normally positioned as shown in FIG.1, while in operation, each of them communicates with the hydraulic booster 20 through the control valves 61, 62 and the hydraulic circuits 73, 74.

The first to fourth changeover valves 65 to 68 are controlled by the controller 100, which will be described later, in such a manner that in the anti-locking operation, the first, third and fourth changeover valves 65, 67 and 68 are operative while the second changeover valve 66 is inoperative in its first operating position, whereas in the anti-slip operation, the first changeover valve 65 is firstly operative and then the second changeover valve 66 is operative while the third and fourth changeover valves 67, 68 are inoperative. The inside passages of the first to fourth changeover valves 65 to 68 at the operative sides thereof and the inside passage of the second changeover valve 66 at the inoperative side thereof are respectively provided with orifices as shown in FIG.1.

Each of the control valves 61, 62 is a three ports-three positions solenoid operated valve and is so arranged that each of the third and fourth changeover valves 67, 68 communicates with the hydraulic booster 20 in a first operating position, the communication therebetween is blocked in a second operating position, and each of the third and fourth changeover valves 67, 68 communicates with the reservoir 41 in a third operating position. Accordingly, the normal braking operation is ordinarily carried out in the second operating position, and the first to third operating positions are selectively positioned in the anti-locking operation to regulate the hydraulic braking pressure. As for the rear road wheels 53, 54, the wheel brake cylinders 53a, 54a are connected to the control valves 63, 64 which are substantially the same as the control valves 61, 62.

The controller 100 comprises a microcomputer (not shown) having a well-known CPU, ROM, RAM and etc. and connected to input and output ports via a common bus to input or output signals between the microcomputer and the outside circuit. Various signals including a signal output from the pressure sensor 40a are amplified by an amplifying circuit (not shown) and fed to the controller 100 after being converted to a digital signal, if necessary. Then, a control signal is fed from the output port to the electric motor 42 via a drive circuit (not shown) and simultaneously the control signal is fed to the first to fourth changeover valves 65 to 68. In the controller 100, a program for a braking control operation including the anti-locking operation and the anti-slip operation is executed.

Figure 2:
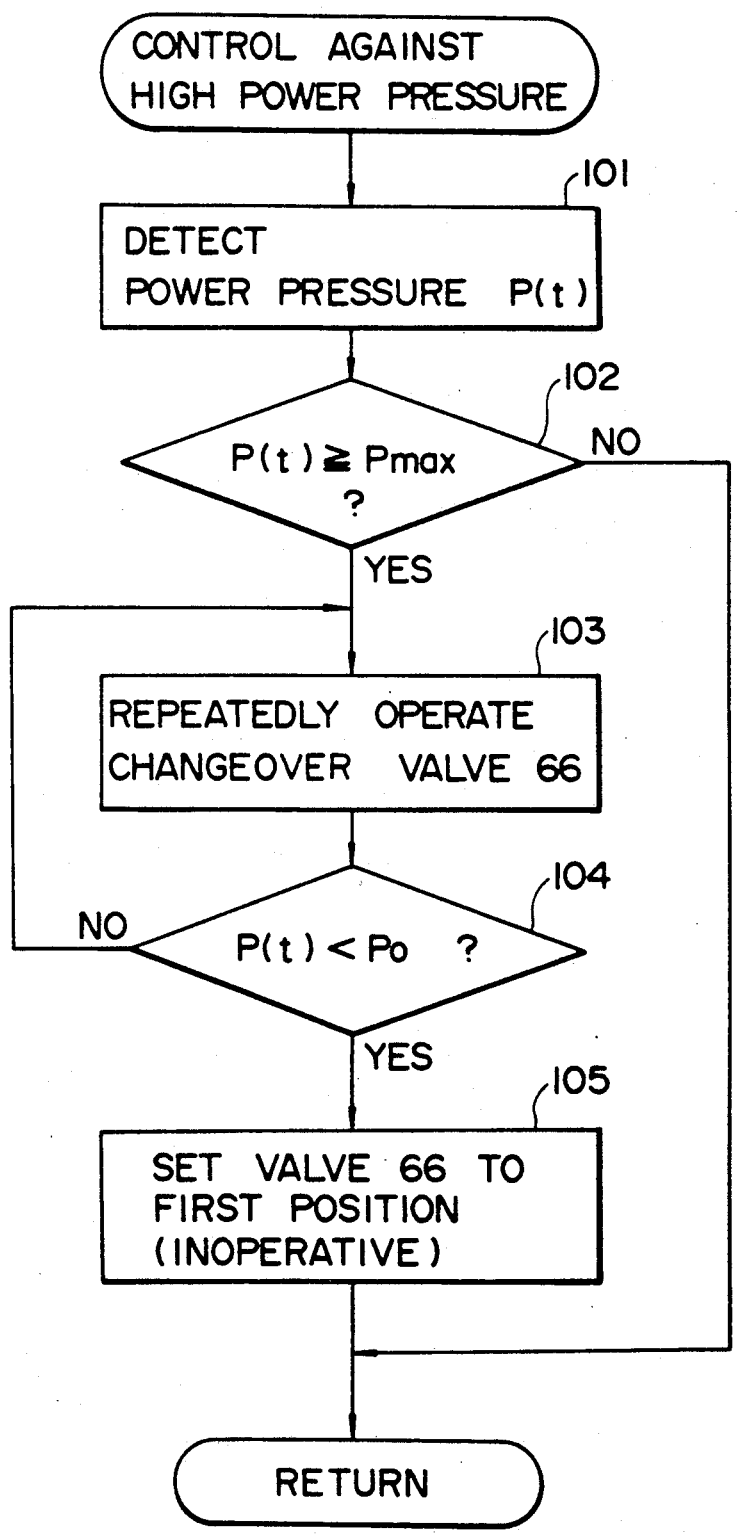
FIG.2 is a flowchart of a program executed when a hydraulic power pressure exceeds a predetermined value in the embodiment of the present invention.

FIG.2 shows a program executed in the case where the hydraulic power pressure is high, as a subroutine to a main routine (not shown) of a program regarding the above-mentioned braking control operation executed in the controller 100. The program shown in FIG.2 is executed when the anti-locking operation and the anti-slip operation are not carried out. The electric motor 42 is driven simultaneously with the start of the engine (not shown), and the hydraulic power pressure $P(t)$ supplied from the fluid pump 43 is controlled so as to be maintained within a predetermined range.

In the case where the hydraulic power pressure is high, the program is executed as follows. At Step 101, the hydraulic power pressure $P(t)$ supplied from the power pressure source 40 is detected on the basis of the signal fed from the pressure sensor 40a. Then, the program proceeds to Step 102 where the hydraulic power pressure $P(t)$ is compared with a predetermined value, i.e., an allowable upper limit value Pmax of the hydraulic power pressure. When the hydraulic power pressure $P(t)$ is determined to be lower than the value Pmax, the program returns to the main routine as it is. On the other hand, when the hydraulic power pressure $P(t)$ is determined to be equal to or more than the value Pmax, the program proceeds to Step 103. Since the hydraulic power pressure $P(t)$ varies within the predetermined range, it is preferable that the comparison of the hydraulic power pressure $P(t)$ with the upper limit value Pmax is carried out on the basis of an integral value of the pressure $P(t)$ obtained during a predetermined period of time, instead of an instantaneous value thereof.

At Step 103, the second changeover valve 66 is changed over to be placed in one of the first and second operating positions alternately. Through the operation executed at Step 103 which will be described later in detail, the second changeover valve 66 is repeatedly changed over until the hydraulic power pressure $P(t)$ becomes lower than a predetermined objective value or a desired value Po (Steps 103, 104). When the hydraulic power pressure $P(t)$ is lower than the desired value Po, the program proceeds to Step 105 where the second changeover valve 66 is rendered to be inoperative and changed over to the first operating position shown in FIG.1, and the program returns to the main routine.

Accordingly, in the normal braking operation, the first to fourth changeover valves 65 to 68 are placed in the positions as shown in FIG.1, so that the front road wheels 51, 52 and the rear road wheels 53, 54 are braked with the hydraulic braking pressure supplied from the tandem master cylinder 10.

Then, in the case where the slip of the road wheels is detected in the braking operation to proceed to the antilocking operation, the first, third and fourth changeover valves 65, 67 and 68 are changed over and placed in the respective second operating positions by the controller 100, and the hydraulic pressure is supplied from the hydraulic booster 20 to the control valves 61 to 64. Further, the respective three operating positions of each of the control valves 61 to 64 are selectively placed on the basis of locking conditions of the rotating front and rear road wheels 51 to 54 to regulate the hydraulic pressure in the wheel brake cylinders 51a to 54a.

In the case where the slip of the rear road wheels 53, 54, or driven wheels, is detected by the controller 100 in starting or acceleration of a vehicle, the first changeover valve 65 is operated so that the hydraulic circuit 71 is blocked. Next, the second changeover valve 66 is operated and the hydraulic power pressure supplied from the power pressure source 40 is applied to the wheel brake cylinders 53a, 54a. Namely, a braking force is applied to the rear road wheels 53, 54, irrespective of the brake pedal 2, and the control valves 63, 64 are operated by the controller 100 to decrease, increase or hold the hydraulic pressure in the wheel brake cylinders 53a, 54a on the basis of the slip condition. Thus, the excessive rotation of the rear road wheels 53, 54 is restrained to prevent the slip thereof.

Accordingly, the hydraulic power pressure supplied from the power pressure source 40 is ordinarily in a waiting condition in the second changeover valve 66 until the first changeover valve 65 becomes operative, and besides, when the first changeover valve 65 is operated, the control valves 63, 64 communicate with the hydraulic booster 20 while the hydraulic circuit 71 is blocked, so that the hydraulic circuit 71 never communicates with the power pressure source 40.

In the case where the hydraulic pressure is not supplied from the hydraulic booster 20 due to the disappearance of the hydraulic power pressure from the power pressure source 40, for example, or the case where the leakage of fluid occurs at the side of the wheel brake cylinders 51a, 52a, the first, third and fourth changeover valves 65, 67 and 68 are rendered to be inoperative, and the front and rear road wheels are braked in response to the operation of the master cylinder 10.

In the case where the fluid pump 43 continues rotating for some reason, the hydraulic power pressure supplied from the power pressure source 40 is consequently increased. This hydraulic power pressure is detected as P(t) by the pressure sensor 40a, and the detected signal is fed to the controller 100. Thus, the program shown in FIG.2 is executed in the controller 100 as mentioned above, and the second changeover valve 66 is controlled so as to be repeatedly changed over. At this time, the first changeover valve 65 is placed in the position as shown in FIG.1, so that the hydraulic circuit 75 is blocked by the first changeover valve 65. Accordingly, when the second changeover valve 66 placed in the first operating position as shown in FIG.1 is changed over to the second operating position to be operative so that the hydraulic circuit 75 communicates with the power pressure source 40, the hydraulic power pressure is introduced into the hydraulic circuit 75 and then into the fluid chamber 4a of the damper 4 to expand the fluid chamber 4a against the biasing force of the spring 4c.

Consequently, the hydraulic power pressure supplied from the power pressure source 40 is decreased by a value of the hydraulic power pressure introduced into the hydraulic circuit 75 and the fluid chamber 4a of the damper 4. When the second changeover valve 66 is changed over and placed in the first operating position to be inoperative, the hydraulic circuit 75 communicates with the hydraulic circuit 73 and then communicates with the reservoir 41 via the hydraulic booster 20 which is in its inoperative condition. Accordingly, the hydraulic pressure in the hydraulic circuit 75 and the fluid chamber 4a of the damper 4 are decreased. Next, when the second changeover valve 66 is changed over again and placed in the second operating position, the hydraulic power pressure supplied from the power pressure source 40 is introduced into the hydraulic circuit 75 and the damper 4, so that the hydraulic power pressure is decreased by the value of the hydraulic power pressure introduced thereinto. Thus, the second changeover valve 66 is repeatedly changed over and placed in one of the second operating position and the first operating position When the hydraulic power pressure is decreased to be lower than the desired value Po, the second changeover valve 66 is rendered to be inoperative and maintains the condition as shown in FIG.1.

In the above embodiment, the damper 4 is disposed in the hydraulic circuit 75. However, the damper 4 may be omitted by utilizing only the volume of a space in the hydraulic circuit 75, and repeatedly changing over the second changeover valve 66 at high speed to obtain the same effect as the damper 4. Thus, the hydraulic circuit 75 corresponds to the passage defining a closed space therein according to the present invention.

Further, in the above embodiment, the hydraulic booster 20 is used as the dynamic hydraulic pressure generator according to the present invention. Otherwise, a negative pressure booster, for example, may be used as the booster, and a pressure regulating device having a hydraulic control valve similar to that of the hydraulic booster 20 may be additionally provided as a separate generator and used for the anti-locking operation.

As has been described in the foregoing, according to the present embodiment, the hydraulic braking system having the power pressure source 40 and the second changeover valve 66 or the power pressure changeover valve is arranged to determine if the hydraulic power pressure supplied from the power pressure source 40 exceeds the predetermined value. When the hydraulic power pressure exceeds the predetermined value, the second changeover valve 66 is repeatedly changed over and placed in one of the first operating position and the second operating position alternately, whereby the hydraulic power pressure is decreased. Consequently, the hydraulic power pressure is properly controlled so as to prevent the fluid pump 43 from being overloaded.

Further, since the damper 4 is disposed between the first changeover valve 65 and second changeover valve 66, the volume of the fluid chamber 4a of the damper 4 is provided for decreasing the hydraulic power pressure, in addition to the volume of the hydraulic circuit 75 between the first changeover valve 65 and second changeover valve 66. Therefore, the decreasing speed of the hydraulic power pressure is increased, so that the number of times of the changeover operation of the second changeover valve 66 may be reduced, comparing with a system having no damper.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims

What is claimed is:

1. A hydraulic braking system for an automotive vehicle comprising:
   a master cylinder for generating a hydraulic braking pressure in response to operation of a manually-operated member;
   a power pressure source having a fluid pump for pressurizing a brake fluid and generating a hydraulic power pressure;
   a dynamic hydraulic pressure generator for regulating said hydraulic power pressure supplied from said power pressure source in response to operation of said manually-operated member and generating a regulated braking pressure, wherein said dynamic hydraulic power pressure generafor comprises a hydraulic booster for actuating said master cylinder with said hydraulic power pressure supplied from said power pressure source in response to operation of said manually-operated member;
   a plurality of wheel brake cylinders for braking respective road wheels with one of said hydraulic braking pressure supplied from said master cylinder and said regulated braking pressure supplied from said dynamic hydraulic pressure generator;
   a power pressure changeover valve connected to a passage defining a closed space therein and selectively placed in one of a first operating position where said passage is communicated with a space under an atmospheric pressure, and a second operating position where said passage is communicated with said power pressure source;
   a pressure sensor for detecting said hydraulic power pressure generated from said power pressure source;
   determination means for determining if said hydraulic power pressure detected by said pressure sensor exceeds a predetermined value;
   changeover means for repeatedly changing over said power pressure changeover valve to be placed in one of said first operating positions and said second operating position of said power pressure changeover valve alternately when said determination means determines that said hydraulic power pressure exceeds said predetermined value; and a damper disposed in said passage, said damper forming therein a space whose volume varies in response to a hydraulic pressure supplied thereinto.

2. A hydraulic braking system for an automotive vehicle comprising:

a master cylinder for generating a hydraulic braking pressure in response to operation of a manually-operated member;

a power pressure source having a fluid pump for pressurizing a brake fluid and generating a hydraulic power pressure;

a dynamic hydraulic pressure generator for regulating said hydraulic power pressure supplied from said power pressure source in response to operation of said manually-operated member and generating a regulated braking pressure, wherein said dynamic hydraulic power pressure generator comprises a hydraulic booster for actuating said master cylinder with said hydraulic power pressure supplied from said power pressure source in response to operation of said manually-operated member;

a plurality of wheel brake cylinders for braking respective road wheels including driven wheels;

a first changeover valve for selectively communicating at least said wheel brake cylinders for braking said driven wheel with one of said dynamic hydraulic pressure generator and said master cylinder;

a second changeover valve disposed in a hydraulic circuit connecting said first changeover valve to said dynamic hydraulic pressure generator, and selectively placed in one of a first operating position where said first changeover valve is communicated with said dynamic hydraulic pressure generator, and a second operating positions where said first changeover valve is communicated with said power pressure source;

a pressure sensor for detecting said hydraulic power pressure generated from said power pressure source;

determination means for determining if said hydraulic power pressure detected by said pressure sensor exceeds a predetermined value;

changeover means for repeatedly changing over said second changeover valve to be placed in one of said first operating positions and said second operating position of said power pressure changeover valve alternately when said determination means determines that said hydraulic power pressure exceeds said predetermined value;

control valves disposed between said first changeover valve and each of said wheel brake cylinders for braking said driven wheels, said control valves controlling a hydraulic pressure in each of said wheel brake cylinders depending on a braking condition of said vehicle; and a damper disposed in a hydraulic circuit connecting said first changeover valve to said second changeover valve, said damper forming therein a space whose volume varies in response to a hydraulic pressure supplied thereinto.

3. A hydraulic braking system for an automotive vehicle as set forth in claim 2, wherein said first changeover valve comprises a three ports-two positions solenoid operated valve with a first port thereof connected to said master cylinder, and wherein said second changeover valve comprises a three ports-two positions solenoid operated valve with a first port thereof connected to said hydraulic booster, a second port thereof connected to a third port of said first changeover valve, and a third port of said second changeover valve connected to said power pressure source.

4. A hydraulic braking system for an automotive vehicle as set forth in claim 3, wherein said second changeover valve includes a first inside passage for connecting said first port thereof to said second port thereof and a second inside passage for connecting said second port thereof to said third port thereof, and wherein each of said first and second inside passages is provided with an orifice.

5. A hydraulic braking system for an automotive vehicle as set forth in claim 2, wherein said damper includes a housing having a bore defined therein, a piston slidably disposed in said bore to form a fluid chamber in said housing, and a spring disposed in said housing for biasing said piston in a direction to reduce a volume of said fluid chamber, said fluid chamber being communicated with said hydraulic circuit between said first changeover valve and said second changeover valve.

6. A hydraulic braking system for an automotive vehicle as set forth in claim 5, wherein said determination means obtains an integral value of said hydraulic power pressure detected by said pressure sensor during a predetermined period of time and determines if said hydraulic power pressure detected by said pressure sensor exceeds said predetermined value on the basis of said integral value.

* * * * *